United States Patent [19]
Cherpantier et al.

[11] Patent Number: 5,805,993
[45] Date of Patent: Sep. 8, 1998

[54] CELL LEVEL CHANGE CONTROL DEVICE FOR CELLULAR MOBILE RADIO NETWORKS WITH MORE THAN ONE LEVEL OF CELL

[75] Inventors: Corinne Cherpantier, Garches; Laurent Julia, Paris, both of France

[73] Assignee: Alcatel CIT, Paris, France

[21] Appl. No.: 729,394

[22] Filed: Oct. 11, 1996

[30] Foreign Application Priority Data

Oct. 12, 1995 [FR] France .................................. 95 11985

[51] Int. Cl.⁶ ....................................................... H04Q 7/20
[52] U.S. Cl. ........................ 455/422; 455/444; 455/446; 455/453
[58] Field of Search ..................... 455/33.1, 33.2, 455/33.4, 54.1, 56.1, 62, 63, 422, 443, 444, 449, 450, 446, 436, 517, 524, 464; 379/60

[56] References Cited

U.S. PATENT DOCUMENTS

| | | | |
|---|---|---|---|
| 4,670,899 | 6/1987 | Brody et al. | 455/33.4 |
| 5,175,867 | 12/1992 | Wejke et al. | 455/33.4 |
| 5,241,685 | 8/1993 | Bodin et al. | 455/67.1 |
| 5,345,499 | 9/1994 | Benveniste . | |
| 5,396,645 | 3/1995 | Huff | 455/441 |
| 5,513,379 | 4/1996 | Benveniste et al. | 455/33.4 |
| 5,513,380 | 4/1996 | Ivanov et al. | 455/56.1 |
| 5,530,910 | 6/1996 | Taketsugu | 455/33.4 |
| 5,548,806 | 8/1996 | Yamaguchi et al. | 455/33.4 |

FOREIGN PATENT DOCUMENTS

| | | |
|---|---|---|
| 0504122A2 | 9/1992 | European Pat. Off. . |
| 0526436A1 | 2/1993 | European Pat. Off. . |
| 0196722 | 8/1991 | Japan .................................. 455/33.4 |
| WO9312589 | 6/1993 | WIPO . |

Primary Examiner—Jacques H. Louis-Jacques
Assistant Examiner—Getrude Arthur
Attorney, Agent, or Firm—Sughrue, Mion, Zinn, Macpeak & Seas, PLLC

[57] ABSTRACT

A cell level change control device for cellular mobile radio networks with more than one level of cells includes means for comparing the value of a parameter representative of the speed of a mobile station with a threshold in order to decide if it is necessary to command a cell level change when the mobile station is served by a lower level cell contained in a higher level cell or when a mobile station is served by a higher level cell and it is determined that the lower level cell contained in that higher level cell constitutes the best cell. The device determines the load of the higher level cell and varies the threshold in accordance with the load.

10 Claims, 1 Drawing Sheet

CELL LEVEL CHANGE CONTROL DEVICE FOR CELLULAR MOBILE RADIO NETWORKS WITH MORE THAN ONE LEVEL OF CELL

BACKGROUND OF THE INVENTION

1. Field of the Invention

The present invention concerns cellular mobile radio networks.

The invention is more particularly concerned with cellular mobile radio networks with more than one level of cells, for example macrocells (also known as umbrella cells) and microcells contained within the latter for locally offloading them in heavy traffic areas and/or preventing shadow areas in their geographical coverage.

2. Description of the Prior Art

In cellular networks the general principle of continuous selection during a call of the best cell, i.e. the cell providing the best call quality, with a view to effecting a change of cell (or "handover") from the current server cell to that best cell, which thereby becomes the new server cell, is known in itself.

Various parameters can be taken into account in determining the best cell, including the receive level for the server cell and the adjacent cells.

In cellular networks with more than one level of cells, when a mobile station is served by a macrocell and it is determined that a microcell contained within that macrocell constitutes the best cell, on the basis of the better call quality criterion mentioned above, verifying whether at the end of a particular time called the minimum residence time that microcell is still the best cell, before authorizing a change of server cell level, in this instance from the macrocell to the microcell, is also known in itself, this condition being satisfied in particular when the speed of the mobile station is sufficiently low.

An approach of this kind is described in document EP 0 589 278, for example.

In the case of a fast moving mobile station crossing a succession of microcells within the macrocell, it prevents continuous changes of server cell that could degrade call quality or even cut off the call.

When a mobile station is served by a microcell and it is determined that the speed of the mobile is sufficiently high, effecting a change of cell level, in this instance from the microcell to the macrocell containing it, for the same reasons, is also known in itself.

A problem arises with these methods, however, because too high a minimum residence time or too low a minimum speed can lead to saturation of the macrocell, while too low a minimum residence time and too high a minimum speed can significantly increase the number of handovers.

An essential object of the present invention is to solve this problem.

SUMMARY OF THE INVENTION

The present invention therefore consists in a cell level change control device for cellular mobile radio networks with more than one level of cells, including means for comparing the value of a parameter representative of the speed of a mobile station with a threshold in order to decide if it is necessary to command a cell level change when the mobile station is served by a lower level cell contained in a higher level cell or if a mobile station is served by a higher level cell and it is determined that the lower level cell contained in said higher level cell constitutes the best cell, said device further including means for determining the load of said higher level cell and means for varying said threshold in accordance with said load.

Symmetrically, the present invention also consists in a cell level change control device for cellular mobile radio networks with more than one level of cells, including means for comparing the value of a parameter representative of the speed of a mobile station with a threshold in order to decide if it is necessary to command a cell level change when the mobile station is served by a higher level cell containing a lower level cell or when a mobile station is served by a lower level cell and it is determined that a higher level containing said lower level cell constitutes the best cell, said device further including means for determining the load of said lower level cell and means for varying said threshold in accordance with said load.

Other objects and features of the present invention will emerge from a reading of the following description of one embodiment of the invention given with reference to the accompanying drawings.

DETAILED DESCRIPTION OF THE PREFERRED EMBODIMENT

The embodiment of the invention described below by way of example and with reference to FIGS. 1 and 2 corresponds more particularly to the situation in which the threshold is varied according to the load of the higher level cell (for example the macrocell) and the current server cell is that higher level cell.

Figure 1:
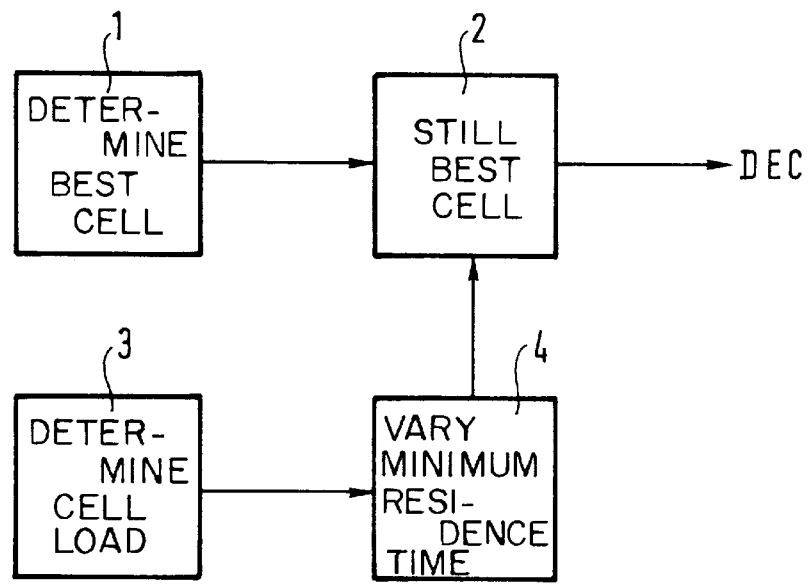
FIG. 1 is a block diagram of one embodiment of a device of the invention.

The device shown in FIG. 1 includes:

means 1 for continuously determining the best cell, using a best call quality criterion, for example, means 2 for determining, when this best cell is a lower level cell (a microcell, for example), if, at the end of a particular time called the minimum residence time of the mobile station in the lower level cell, the lower level cell still constitutes the best cell, in which case a command to change level, in this instance from the higher level cell to the lower level cell, is executed, means 3 for continuously determining the load of the higher level cell including the lower level cell in question, means 4 for varying the minimum residence time used by the means 2 in accordance with the load as determined by the means 3.

In this example the combination of the means 1 and 2 constitutes said means for comparing the value of a parameter representative of the speed of the mobile station (in this instance the residence time) with a threshold in order to decide whether to execute a command to change cell level, in the case where a mobile station is served by a higher level cell and it is determined that a lower level cell constitutes the best cell.

The decision (DEC) whether to change cell level or not is issued by the means 2 operating under the control of the means 4.

The means 1 for determining the best cell are conventionally provided in cellular systems in which a mobile station regularly carries out measurements, in particular measurements of the level at which it receives from its server cell and adjacent cells, and transmits the results of these measurements to the server cell (using a slow associated control channel (SACCH) in the GSM system, for example).

The means 2 for determining, when the mobile station is served by a higher level cell and if the best cell determined in this way is a lower level cell, whether, at the end of a particular time known as the minimum residence time of the mobile station in the lower level cell, the lower level cell still constitutes the best cell, include, for example, means for storing a plurality of successive results provided by the means 1 during this minimum residence time and for determining from all those results whether the lower level cell in fact constitutes the best cell.

The means 3 for determining the load of the higher level cell can determine the ratio of the number of traffic channels occupied to the total number of traffic channels, for example, in a multiple access system (enabling simultaneous different calls on different traffic channels).

The means 4 for varying the minimum residence time as a function of the load of the higher level cell can operate as in the example described below, for example.

If the load of the higher level cell is greater than a defined high value, for example, the minimum residence time is reduced by a predetermined amount, for example x seconds, and if that load is below a defined low value, the minimum residence time is increased by a predetermined amount, for example x seconds.

Figure 2:
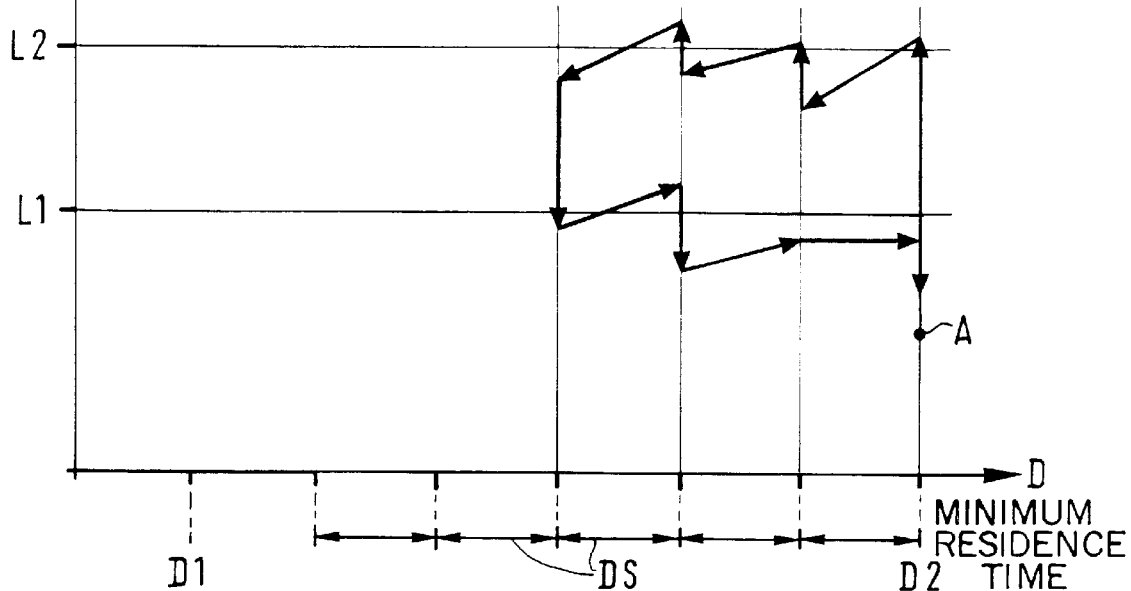
FIG. 2 is a diagram showing the principle of operation of a device as shown in FIG. 1.

This is shown in the FIG. 2 diagram in which:

the minimum residence time D in a lower level cell is plotted on the abscissa axis, and the load L of the higher level cell including this lower level cell is plotted on the ordinate axis.

The following are also marked along the abscissa axis:

a defined lower minimum residence time value D1 which in practise is the minimum time to repeat the measurement of the parameters considered to determine if the lower level cell constitutes the best cell required to make the measurement stable, and a defined upper minimum residence time value D2 from which it is decided, without reference to any other condition, whether the server cell should be the lower level cell.

The following are also marked on the ordinate axis:

a defined low value L1 of the higher level cell load, and a defined high value L2 of the higher level cell load.

The load L is increased from an initial point A corresponding, for example, to the value D2 and to a load value less than the load value L1 (which is the case at the start of the day, when traffic is low).

From the time the load L exceeds the high value L2, the minimum residence time is reduced, in steps DS, to maintain the load L in the area between L1 and L2.

Conversely, from the time the load L falls below the low value L1 (in particular because the traffic falls off at the end of the day) the minimum residence time is increased in steps to avoid unnecessary increase in the number of server cell changes, until the initial situation is returned to (point A).

Another example of application of the invention is the situation in which the server cell is a lower level cell and it has to be determined whether the speed of the mobile station is sufficiently high to decide on a change of cell level, in this instance from the lower level cell to the higher level cell containing it.

In accordance with the invention, the minimum speed of the mobile station from which a cell level change of this kind is decided on is varied in accordance with the load of the higher level cell, in line with a principle that is similar in all respects to that described in the above example, except that in this case the threshold is raised when the load increases and lowered when the load decreases.

In this way, if the load on the higher level cell is heavy, a fast mobile is retained on the lower level.

Symmetrically, the present invention also consists in a cell level change control device for cellular mobile radio networks with more than one level of cells, the device including:

means (which can also be represented by the means 1, 2 of FIG. 1) for comparing the value of a parameter representative of the speed of the mobile station to a threshold in order to decide if it is necessary to command a change of cell level when a mobile is served by a higher level cell containing a lower level cell or when a mobile station is served by a lower level cell and it is determined that a higher level cell containing that lower level cell constitutes the best cell, means (which can also be represented by the means 3 of FIG. 1) for determining the load of said lower level cell, and p1 means (which can also be represented by the means 4 of FIG. 1) for varying said threshold in accordance with said load.

Symmetrically:

in the case of a cell level change from the higher level to the lower level said means for varying said threshold in accordance with said load include means for raising that threshold when the load increases, in the case of a cell level change from the higher level to the lower level said means for varying said threshold in accordance with said load include means for lowering that threshold when that load decreases, in the case of a cell level change from the lower level to the higher level said means for varying said threshold in accordance with said load include means for raising that threshold when that load decreases, in the case of a cell level change from the lower level to the higher level said means for varying said threshold in accordance with said load include means for lowering that threshold when that load increases.

There is claimed:

1. A cell level change control device for cellular mobile radio networks with more than one level of cells, comprising:

means for comparing the value of a parameter representative of the speed of a mobile station with a threshold for deciding if it is necessary to execute a command to change cell level when the mobile station is served by a lower level cell contained in a higher level cell or, if the mobile station is served by a higher level cell having a lower level cell, when it is determined that the lower level cell is the best cell;

means for determining the load of said higher level cell; and means for varying said threshold in accordance with said load.

2. The device claimed in claim 1 wherein in the case of a cell level change from the higher level to the lower level said means for varying said threshold in accordance with said load include means for lowering said threshold when said load increases.

3. The device claimed in claim 1 wherein in the case of a cell level change from the higher level to the lower level said means for varying said threshold in accordance with said load include means for raising said threshold when said load decreases.

4. The device claimed in claim 1 wherein in the case of a cell level change from the lower level to the higher level said means for varying said threshold in accordance with said load include means for lowering said threshold when said load decreases.

5. The device claimed in claim 1 wherein in the case of a cell level change from the lower level to the higher level said means for varying said threshold in accordance with said load include means for raising said threshold when said load increases.

6. A cell level change control device for cellular mobile radio networks with more than one level of cells, comprising:

means for comparing the value of a parameter representative of the speed of a mobile station with a threshold for deciding if it is necessary to execute a command to change cell level when the mobile station is served by a higher level cell containing a lower level cell or, if the mobile station is served by a lower level cell in a higher level cell it is determined that the higher level cell is the best cell;

means for determining the load of said lower level cell; and means for varying said threshold in accordance with said load.

7. The device claimed in claim 6 wherein in the case of a cell level change from the higher level to the lower level said means for varying said threshold in accordance with said load include means for raising said threshold when said load increases.

8. The device claimed in claim 6 wherein in the case of a cell level change from the higher level to the lower level said means for varying said threshold in accordance with said load include means for lowering said threshold when said load decreases.

9. The device claimed in claim 6 wherein in the case of a cell level change from the lower level to the higher level said means for varying said threshold in accordance with said load include means for raising said threshold when said load decreases.

10. The device claimed in claim 6 wherein in the case of a cell level change from the lower level to the higher level said means for varying said threshold in accordance with said load include means for lowering said threshold when said load increases.

* * * * *